United States Patent
Yokomakura et al.

(10) Patent No.: US 9,370,012 B2
(45) Date of Patent: Jun. 14, 2016

(54) WIRELESS CONTROL APPARATUS, WIRELESS COMMUNICATION SYSTEM, CONTROL PROGRAM, AND INTEGRATED CIRCUIT

(75) Inventors: Kazunari Yokomakura, Osaka (JP); Yasuhiro Hamaguchi, Osaka (JP); Osamu Nakamura, Osaka (JP); Jungo Goto, Osaka (JP); Hiroki Takahashi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 308 days.

(21) Appl. No.: 13/985,138

(22) PCT Filed: Jan. 30, 2012

(86) PCT No.: PCT/JP2012/052024
§ 371 (c)(1),
(2), (4) Date: Aug. 13, 2013

(87) PCT Pub. No.: WO2012/111417
PCT Pub. Date: Aug. 23, 2012

(65) Prior Publication Data
US 2013/0324143 A1  Dec. 5, 2013

(30) Foreign Application Priority Data
Feb. 14, 2011  (JP) .................... 2011-028977

(51) Int. Cl.
*H04W 72/00* (2009.01)
*H04W 72/08* (2009.01)
(Continued)

(52) U.S. Cl.
CPC ............. *H04W 72/082* (2013.01); *H04B 17/21* (2015.01); *H04B 17/27* (2015.01); *H04B 17/345* (2015.01);
(Continued)

(58) Field of Classification Search
CPC ...... H04W 16/14; H04W 72/04; H04W 16/12; H04W 24/00; H04W 28/04; H04W 72/0446; H04W 84/08; H04L 1/0026; H04L 2012/5607; H04M 1/72511
USPC .................. 455/63.1, 67.13, 450, 451, 452.1, 455/452.2, 464; 370/310.2, 329, 330, 341
See application file for complete search history.

(56) References Cited

U.S. PATENT DOCUMENTS

2011/0212743 A1  9/2011 Yokomakura et al.

FOREIGN PATENT DOCUMENTS

| JP | 2006-217415 A | 8/2006 | |
|---|---|---|---|
| JP | 2010-050935 | * 3/2010 | ............ H04W 16/14 |
| WO | WO 2009/022709 A1 | 2/2009 | |

OTHER PUBLICATIONS

Hiroki Takashashi et al., "Performance Evaluation of A Spectrum-Overlapped Resource Management using Single Carrier under Multi-User Environment," IEICE Technical Report, May 14, 2009, pp. 139 to 144, RCS2009-24.

*Primary Examiner* — Steve D Agosta
(74) *Attorney, Agent, or Firm* — Birch, Stewart, Kolasch & Birch, LLP

(57) ABSTRACT

In SORM (Spectrum-Overlapped Resource Allocation), interference to other cells caused by an increase in transmit power of mobile station apparatuses is suppressed. A wireless control apparatus allows a plurality of wireless terminal apparatuses to locate transmit signals at part of frequencies in a system band in an overlapping manner, and determines frequencies at which the individual wireless terminal apparatuses locate transmit signals, so that an interference level of the entire system band is suppressed to be lower than or equal to a certain value. Also, the wireless control apparatus determines frequencies at which the individual wireless terminal apparatuses locate transmit signals, so that a total sum of frequency bands allocated to the individual wireless terminal apparatuses is smaller than or equal to the system band.

7 Claims, 11 Drawing Sheets

(51) Int. Cl.
  *H04L 5/00* (2006.01)
  *H04W 52/24* (2009.01)
  *H04L 1/18* (2006.01)
  *H04B 17/21* (2015.01)
  *H04B 17/27* (2015.01)
  *H04B 17/345* (2015.01)
  *H04W 28/04* (2009.01)
  *H04W 72/04* (2009.01)
  *H04L 25/02* (2006.01)

(52) U.S. Cl.
  CPC ............ *H04L 1/1861* (2013.01); *H04L 5/0005* (2013.01); *H04L 5/0032* (2013.01); *H04L 5/0062* (2013.01); *H04L 5/0073* (2013.01); *H04W 52/243* (2013.01); *H04W 52/244* (2013.01); *H04L 25/0224* (2013.01); *H04W 28/048* (2013.01); *H04W 72/0453* (2013.01)

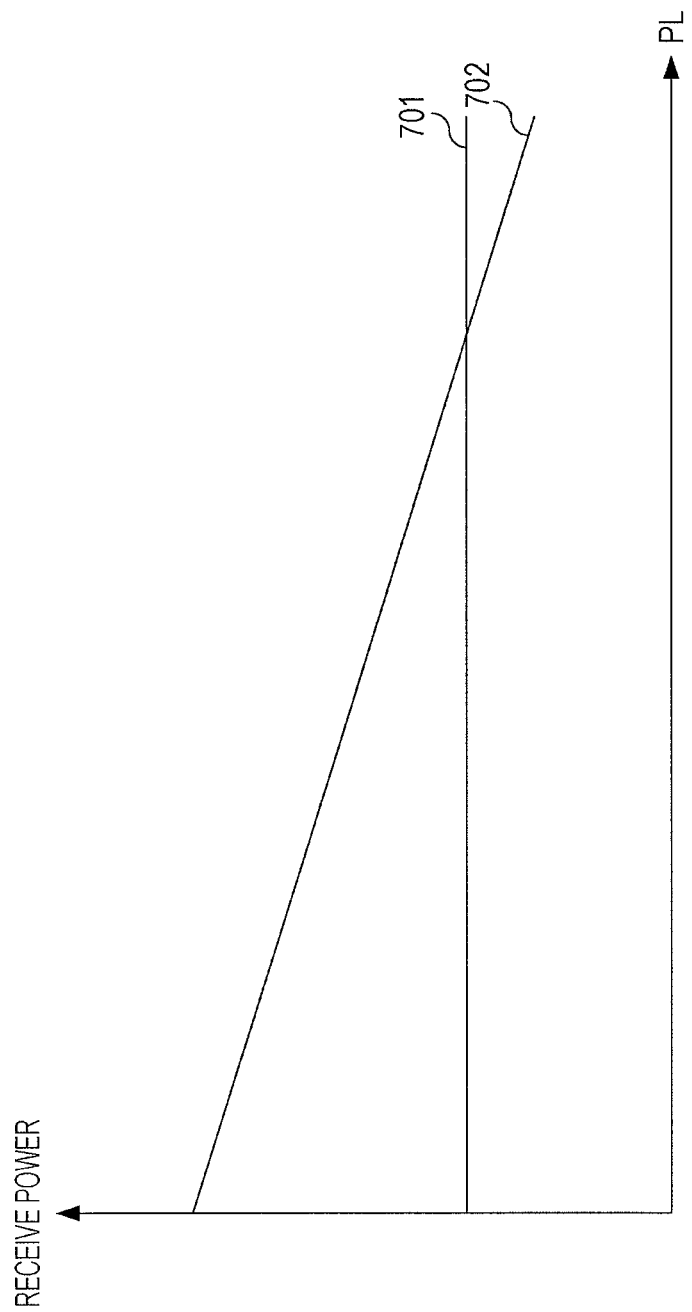

WIRELESS CONTROL APPARATUS, WIRELESS COMMUNICATION SYSTEM, CONTROL PROGRAM, AND INTEGRATED CIRCUIT

TECHNICAL FIELD

The present invention relates to a wireless communication system.

BACKGROUND ART

The standardization of the LTE (Long Term Evolution) system, which is the 3.9th generation wireless communication system for mobile phones, has been substantially completed. Recently, the standardization of LTE-A (LTE-Advanced), which is a development of the LTE system, has been progressing as the 4th generation wireless communication system (also referred to as IMT-A or the like).

Generally, in uplink of a mobile communication system (communication from a mobile station apparatus to a base station apparatus), a mobile station apparatus serves as a transmitter, and thus a single carrier scheme is considered to be effective in which power usage efficiency of an amplifier can be kept high with limited transmit power and peak power is low (in LTE, an SC-FDMA (Single Carrier Frequency Division Multiple Access) scheme is adopted). SC-FDMA is also referred to as DFT-S-OFDM (Discrete Fourier Transform Spread Orthogonal Frequency Division Multiplexing) or DFT-precoded OFDM.

In LTE-A, to further enhance frequency usage efficiency, it has been determined to newly support an access scheme which is referred to as Clustered DFT-S-OFDM (also referred to as DSC (Dynamic Spectrum Control), SC-ASA (Single Carrier Adaptive Spectrum Allocation), or the like), in which an SC-FDMA spectrum is divided into clusters constituted by a plurality of sub-carriers, and the individual clusters are allocated to certain frequencies along a frequency axis, for a mobile station apparatus having sufficient transmit power.

Furthermore, spectrum-overlapped resource management (SORM) has been suggested, in which a higher priority is given to channel characteristics and overlap on a receiving side is allowed at the time of spectrum allocation for individual mobile station apparatuses, without performing frequency division multiplexing, under the assumption that turbo equalization is used for reception processing (for example, PTL 1).

In SORM, frequency resources are allocated to individual mobile station apparatuses while giving a higher priority to channel characteristics. Therefore, signals from different mobile station apparatuses are received by a base station apparatus with the signals being partially overlapped one on another. The base station apparatus that is capable of detecting all transmit data from the individual mobile station apparatuses is capable of gradually detecting the signals by using detection results (soft estimates) about all the mobile station apparatuses connected thereto.

In addition, NPL 1 discloses a technique in which a base station apparatus causes some of frequency resources to be overlapped, thereby saving the frequency resources of an entire system band. With this technique, the base station apparatus is capable of allocating more frequency resources and enhancing the overall frequency usage efficiency.

CITATION LIST

Patent Literature

PTL 1: International Publication No. 2009/022709

Non Patent Literature

NPL 1: Takahashi et al., RCS2009-24, May 2009

SUMMARY OF INVENTION

Technical Problem

In uplink communication, when individual mobile station apparatuses transmit data, transmit power control (TPC) is applied so that a base station apparatus can receive the data at a certain reception level. The transmit power control also plays a role of adjusting the amount of an interference level with respect to an adjacent cell, and the level of interference waves is controlled as IoT (Interference over Thermal noise). Therefore, if the method according to NPL 1 is adopted as is, transmit power of mobile station apparatuses increases because more radio resources are allocated than in a conventional scheme, and therefore an interference level for other cells (sectors) also increases. In this case, in the other cells (sectors), control is performed to further increase transmit power in order to satisfy required quality of mobile station apparatuses, resulting in a conflict in which the individual cells (sectors) increase a desired reception level. Accordingly, the system is destabilized disadvantageously.

The present invention has been made in view of these circumstances, and an object of the invention is to provide a wireless control apparatus, a wireless communication system, a control program, and an integrated circuit that are capable of suppressing interference to other cells caused by an increase in transmit power of mobile station apparatuses, by using SORM.

Solution to Problem (1) To achieve the above-described object, the present invention takes the following measures. That is, a wireless control apparatus according to the present invention is a wireless control apparatus that allows a plurality of wireless terminal apparatuses to locate transmit signals at part of frequencies in a system band in an overlapping manner. The wireless control apparatus determines frequencies at which the individual wireless terminal apparatuses locate transmit signals, so that an interference level of the entire system band is suppressed to be lower than or equal to a certain value.

In this way, the wireless control apparatus determines frequencies at which the individual wireless terminal apparatuses locate transmit signals, so that an interference level of the entire system band is suppressed to be lower than or equal to a certain value. Accordingly, the wireless control apparatus is capable of stabilizing the system.

(2) Further, the wireless control apparatus according to the present invention determines frequencies at which the individual wireless terminal apparatuses locate transmit signals, so that a total sum of frequency bands allocated to the individual wireless terminal apparatuses is smaller than or equal to the system band.

In this way, the wireless control apparatus determines frequencies at which the individual wireless terminal apparatuses locate transmit signals, so that a total sum of frequency bands allocated to the individual wireless terminal apparatuses is smaller than or equal to the system band, and is thus capable of stabilizing the system.

(3) Further, the wireless control apparatus according to the present invention calculates a target receive power value in the wireless control apparatus by using a receive power value with which the interference level of the entire system band is lower than or equal to the certain value, and an overlap ratio of frequencies at which transmit signals are located in an overlapping manner in the system band, and determines transmit power of the individual wireless terminal apparatuses on the basis of the target receive power value.

In this way, the wireless control apparatus calculates a target receive power value in the wireless control apparatus by using a receive power value with which the interference level of the entire system band is lower than or equal to the certain value, and an overlap ratio of frequencies at which transmit signals are located in an overlapping manner in the system band, and is thus capable of stabilizing the system to which SORM is applied.

(4) Further, the wireless control apparatus according to the present invention determines transmit power of the individual wireless terminal apparatuses on the basis of the target receive power value and a parameter specific to a cell controlled by the wireless control apparatus.

In this way, the wireless control apparatus determines transmit power of the individual wireless terminal apparatuses on the basis of the target receive power value and a parameter specific to a cell controlled by the wireless control apparatus, and is thus capable of stabilizing the system.

(5) Further, in the wireless control apparatus according to the present invention, the interference level is represented by IoT (Interference over Thermal noise power ratio).

In this way, the interference level is represented by IoT (Interference over Thermal noise power ratio). Accordingly, the wireless terminal apparatuses are capable of adjusting the amount of an interference level with respect to an adjacent cell by performing transmit power control.

(6) Further, in the wireless control apparatus according to the present invention, the IoT is determined by a parameter of transmit power control performed by the wireless terminal apparatuses.

In this way, the IoT is determined by a parameter of transmit power control performed by the wireless terminal apparatuses. Accordingly, the wireless terminal apparatuses are capable of adjusting the amount of an interference level with respect to an adjacent cell by performing transmit power control.

(7) Further, in the wireless control apparatus according to the present invention, the transmit power control is fractional transmit power control.

In this way, the transmit power control is fractional transmit power control. Accordingly, the wireless control apparatus is capable of keeping the amount of interference to an adjacent cell (IoT measured by a second communication apparatus in an adjacent cell) constant without degrading reception quality of a first communication apparatus near the second communication apparatus.

(8) Further, the wireless control apparatus according to the present invention determines, in case of determining frequencies at which the individual wireless terminal apparatuses locate transmit signals, an amount of radio resources at which transmit signals are located in an overlapping manner and an amount of radio resources which are not used, on the basis of the IoT.

In this way, in case of determining frequencies at which the individual wireless terminal apparatuses locate transmit signals, the wireless control apparatus determines an amount of radio resources at which transmit signals are located in an overlapping manner and an amount of radio resources which are not used, on the basis of the IoT. Thus, the wireless control apparatus is capable of performing control to suppress variations of an interference level in the entire system band, and is capable of stabilizing the system.

(9) Further, a wireless communication system according to the present invention includes the wireless control apparatus according to any of the above (1) to (8), and a plurality of wireless terminal apparatuses.

In this way, the wireless communication system includes the wireless control apparatus according to any of the above (1) to (8), and a plurality of wireless terminal apparatuses. Accordingly, the system can be stabilized.

(10) Further, a control program according to the present invention is a control program for a wireless control apparatus that allows a plurality of wireless terminal apparatuses to locate transmit signals at part of frequencies in a system band in an overlapping manner. The control program causes a computer to execute a process of determining frequencies at which the individual wireless terminal apparatuses locate transmit signals, so that an interference level of the entire system band is suppressed to be lower than or equal to a certain value.

In this way, the wireless control apparatus determines frequencies at which the individual wireless terminal apparatuses locate transmit signals, so that an interference level of the entire system band is suppressed to be lower than or equal to a certain value, and is thus capable of stabilizing the system.

(11) Further, the control program according to the present invention further includes a process of determining frequencies at which the individual wireless terminal apparatuses locate transmit signals, so that a total sum of frequency bands allocated to the individual wireless terminal apparatuses is smaller than or equal to the system band.

In this way, the wireless control apparatus determines frequencies at which the individual wireless terminal apparatuses locate transmit signals, so that a total sum of frequency bands allocated to the individual wireless terminal apparatuses is smaller than or equal to the system band, and is thus capable of stabilizing the system.

(12) Further, the control program according to the present invention further includes a process of calculating a target receive power value in the wireless control apparatus by using a receive power value with which the interference level of the entire system band is lower than or equal to the certain value, and an overlap ratio of frequencies at which transmit signals are located in an overlapping manner in the system band, and a process of determining transmit power of the individual wireless terminal apparatuses on the basis of the target receive power value.

In this way, the wireless control apparatus calculates a target receive power value in the wireless control apparatus by using a receive power value with which the interference level of the entire system band is lower than or equal to the certain value, and an overlap ratio of frequencies at which transmit signals are located in an overlapping manner in the system band, and is thus capable of stabilizing the system to which SORM is applied.

(13) Further, the control program according to the present invention further includes a process of determining transmit power of the individual wireless terminal apparatuses on the basis of the target receive power value and a parameter specific to a cell controlled by the wireless control apparatus.

In this way, the wireless control apparatus determines transmit power of the individual wireless terminal apparatuses on the basis of the target receive power value and a parameter specific to a cell controlled by the wireless control apparatus, and is thus capable of stabilizing the system.

(14) Further, an integrated circuit according to the present invention is an integrated circuit that is mounted in a wireless control apparatus to cause the wireless control apparatus to implement a plurality of functions. The integrated circuit causes the wireless control apparatus to implement a series of functions including a function of performing wireless communication with a plurality of wireless terminal apparatuses by allowing the plurality of wireless terminal apparatuses to locate transmit signals at part of frequencies in a system band in an overlapping manner, and a function of determining frequencies at which the individual wireless terminal apparatuses locate transmit signals, so that an interference level of the entire system band is suppressed to be lower than or equal to a certain value.

In this way, the wireless control apparatus determines frequencies at which the individual wireless terminal apparatuses locate transmit signals, so that an interference level of the entire system band is suppressed to be lower than or equal to a certain value, and is thus capable of stabilizing the system.

Advantageous Effects of Invention

According to the present invention, a wireless communication system to which SORM is applied is stabilized. That is, as a result of applying the present invention, even if transmit power increases in an entire cell due to overlapping, a base station apparatus is capable of stabilizing the system.

BRIEF DESCRIPTION OF DRAWINGS

FIG. 11 is a graph illustrating the relationship between the receive power of the base station apparatus 2 and PL in a case where $\alpha$ is changed in a third embodiment of the present invention.

DESCRIPTION OF EMBODIMENTS

Hereinafter, embodiments of the present invention will be described with reference to the drawings. A description will be given below under the assumption that the following embodiments are applicable to SORM, but the present invention is applicable to any method as long as the method is a method for performing communication with signals being overlapped using at least part of the same frequency at the same time, for example, MIMO (Multiple Input Multiple Output).

First Embodiment

Figure 1:
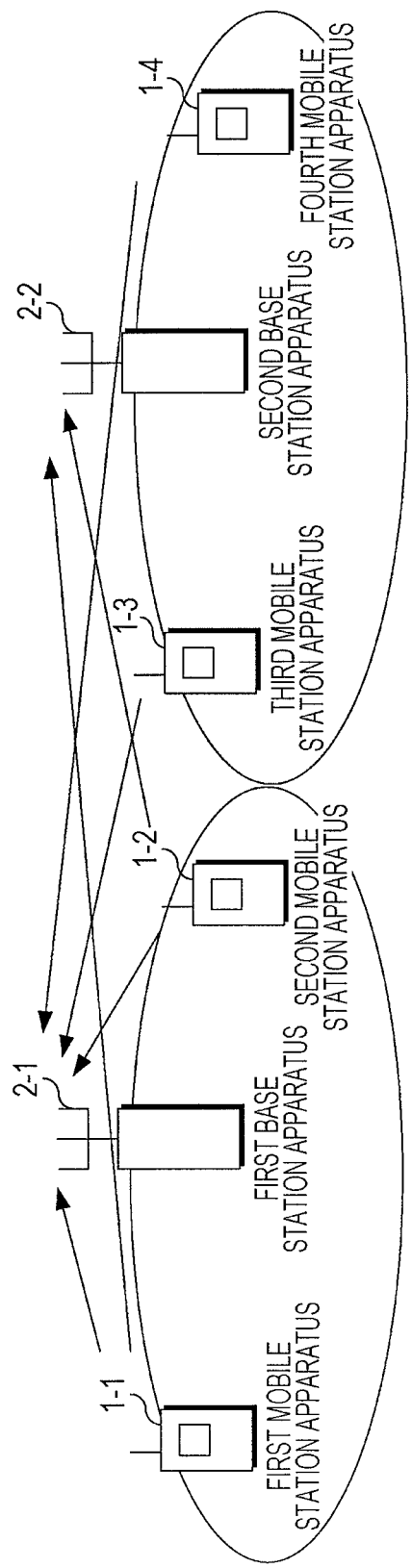
FIG. 1 is a diagram illustrating a concept of a wireless communication system according to the present invention.

FIG. 1 is a diagram illustrating a concept of a wireless communication system according to the present invention. In FIG. 1, it is assumed that a first base station apparatus (wireless control apparatus) 2-1, a first mobile station apparatus (wireless terminal apparatus) 1-1, and a second mobile station apparatus 1-2 are connected, and a second base station apparatus 2-2, a third mobile station apparatus 1-3, and a fourth mobile station apparatus 1-4 are connected. Hereinafter, the first mobile station apparatus 1-1 to the fourth mobile station apparatus 1-4 are collectively referred to as mobile station apparatuses 1, and the first base station apparatus 2-1 and the second base station apparatus 2-2 are collectively referred to as base station apparatuses 2. In this case, as illustrated in FIG. 1, the first mobile station apparatus 1-1 and the second mobile station apparatus 1-2 are interference to the second base station apparatus 2-2, and the third mobile station apparatus 1-3 and the fourth mobile station apparatus 1-4 are interference to the first base station apparatus 2-1.

Figure 2:
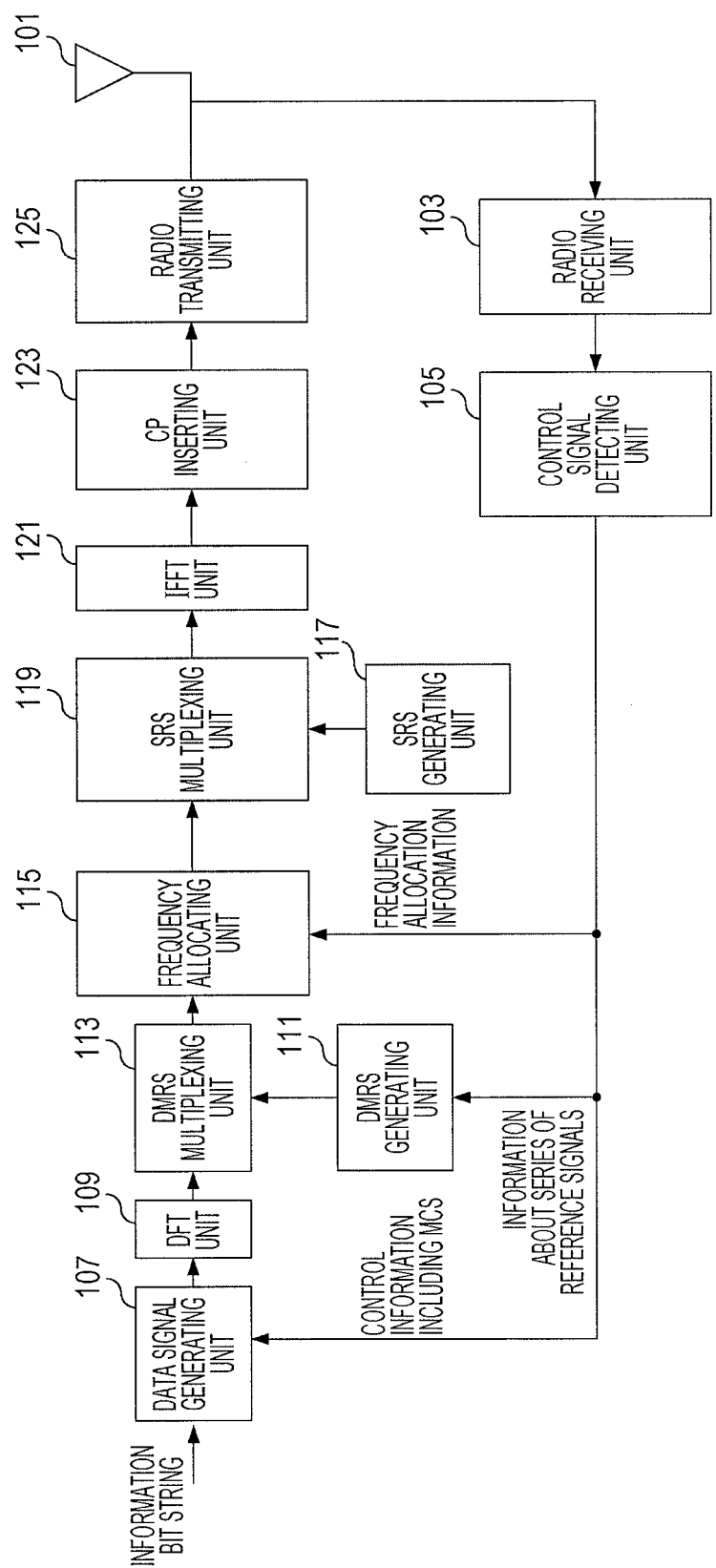
FIG. 2 is a block diagram illustrating the configuration of a mobile station apparatus 1 according to a first embodiment of the present invention.

FIG. 2 is a block diagram illustrating the configuration of the mobile station apparatus 1 according to the first embodiment of the present invention. A control signal transmitted from the base station apparatus 2 and received by an antenna 101 is subjected to down conversion and A/D (Analog to Digital) conversion in a radio receiving unit 103, and is then input to a control signal detecting unit 105. The control signal detecting unit 105 detects control information that is necessary for data transmission, including MCS (Modulation and Coding Schemes) indicating information that is necessary for encoding or modulation, such as a modulation scheme, the number of information bits (also defined as a transport block size), or a coding rate; information indicating a series of demodulation reference signals (including CSI (Cyclic Shift Index) or the like); and frequency allocation information indicating a scheduling result in the base station apparatus 2. The detected control information about modulation, encoding, or retransmission, including MCS, is input to a data signal generating unit 107, in which error-correction coding is performed, and modulation such as quaternary phase shift keying (QPSK) or 16-ary quadrature amplitude modulation (16QAM) is performed.

After that, the resulting signal is transformed to a frequency signal by a discrete Fourier transform (DFT) unit 109. In a demodulation reference signal generating unit 111, a demodulation reference signal (DMRS) is generated on the basis of information about a series of reference signals received from the control signal detecting unit 105, and the generated demodulation reference signal is time-multiplexed with a data signal in a demodulation reference signal multiplexing unit 113. The data signal multiplexed with the DMRS is located in a system band on the basis of frequency allocation information by a frequency allocating unit 115.

Subsequently, a sounding reference signal generating unit 117 generates a sounding reference signal (SRS) with which the base station apparatus 2 grasps the state of the entire system band or part of a channel to perform scheduling. The generated sounding reference signal is multiplexed with the data signal, on which frequency allocation has been performed, by a sounding reference signal multiplexing unit 119. After that, the resulting signal is transformed to a time signal by an inverse fast Fourier transform (IFFT) unit 121. Then, in a cyclic prefix (CP) inserting unit 123, a cyclic prefix (CP) generated by copying a waveform in a backward portion of time to a frontward portion is inserted into the time signal. The time signal is then subjected to D/A (Digital to Analog) conversion and up conversion in a radio transmitting unit 125, and is transmitted from the antenna 101.

Figure 3:
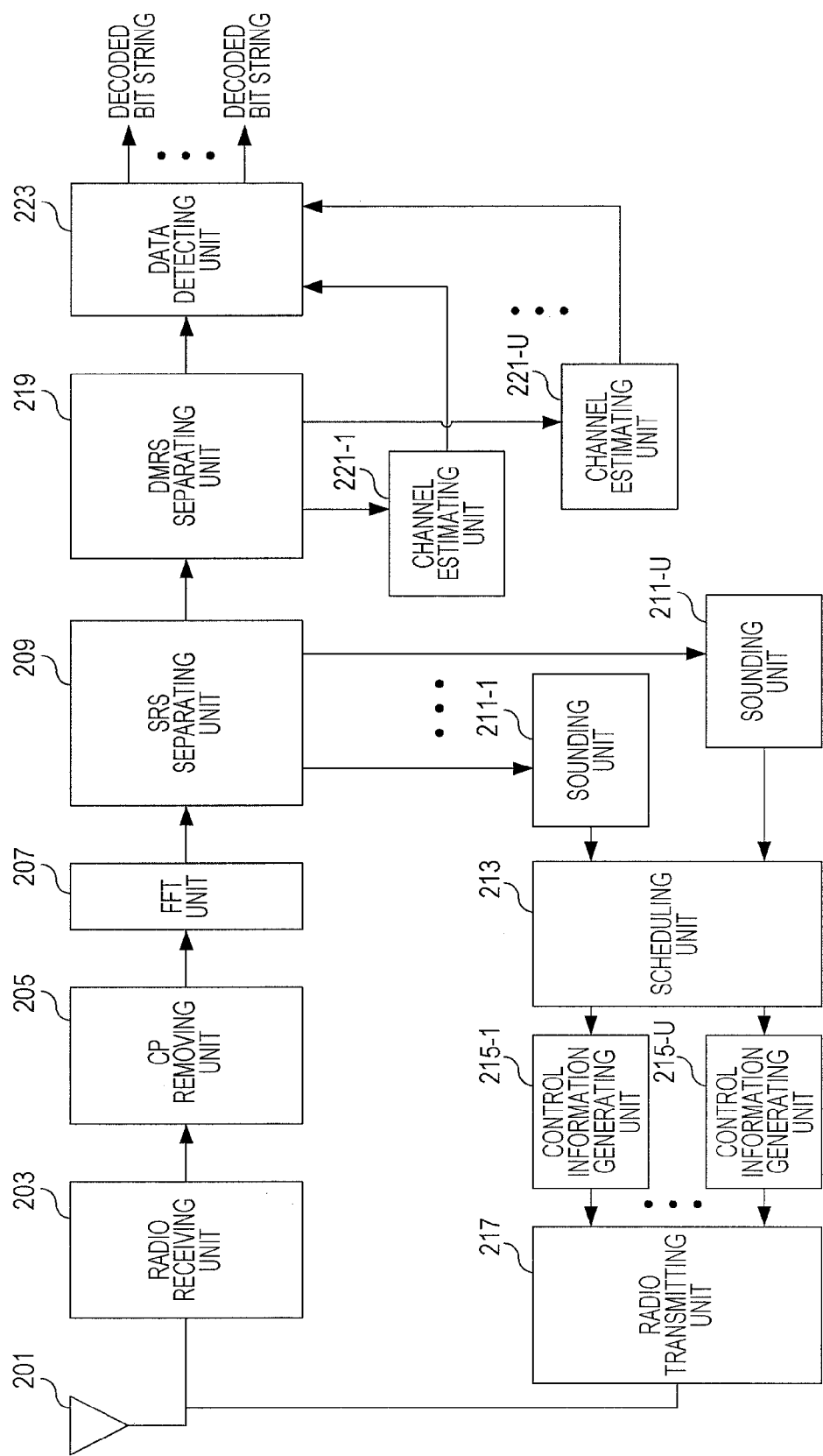
FIG. 3 is a block diagram illustrating the configuration of a base station apparatus 2 according to the first embodiment of the present invention.

FIG. 3 is a block diagram illustrating the configuration of the base station apparatus 2 according to the first embodiment of the present invention. A receive signal received by an antenna 201 is subjected to down conversion and A/D conversion in a radio receiving unit 203, and a CP is removed therefrom by a CP removing unit 205. The receive signal from which the CP has been removed is transformed to a receive signal in the frequency domain by an FFT unit 207. Subsequently, an SRS is separated from the receive signal in the frequency domain by a sounding reference signal separating unit 209. The separated SRS is input to sounding units 211-1 to 211-U (hereinafter, the sounding units 211-1 to 211-U are collectively referred to as sounding units 211) that grasp the state of a channel of a frequency band in which transmission can be performed (channel gain, reception SINR). Here, sounding is performed for each mobile station apparatus 1, and thus the number of sounding units 211 is the same as the number of connected mobile station apparatuses U for convenience. However, one block of a sounding unit may be provided in the case of sequentially performing sounding using SRSs from the individual mobile station apparatuses 1.

Obtained sounding results (channel states) from the individual mobile station apparatuses 1 to the base station apparatus 2 are input to a scheduling unit 213. The scheduling unit 213 determines frequency allocation for the individual mobile station apparatuses 1, and generates other control information that is necessary for communication. At this time, the frequency allocation set by the scheduling unit 213 is determined so as to satisfy expression (1). The obtained control information for the individual mobile station apparatuses 1 is converted to a certain format (a format defined by various wireless communication systems, such as LTE or WiMAX (for example, a downlink control information (DCI) format in LTE)) by control information generating units 215-1 to 215-U, is converted to a radio signal by a radio transmitting unit 217, and is transmitted from the antenna 201. On the other hand, in a demodulation reference signal separating unit 219, a DMRS is separated from the receive signal output from the sounding reference signal separating unit 209. The separated DMRS is used by channel estimating units 221-1 to 221-U to estimate channel characteristics in the frequency used for transmission. A data detecting unit 223 decodes transmit bits by performing nonlinear iterative equalization or the like by using the receive signal from which DMRS has been separated and estimated channel characteristics, thereby obtaining decoded bit strings for the individual mobile station apparatuses 1.

Figure 4:
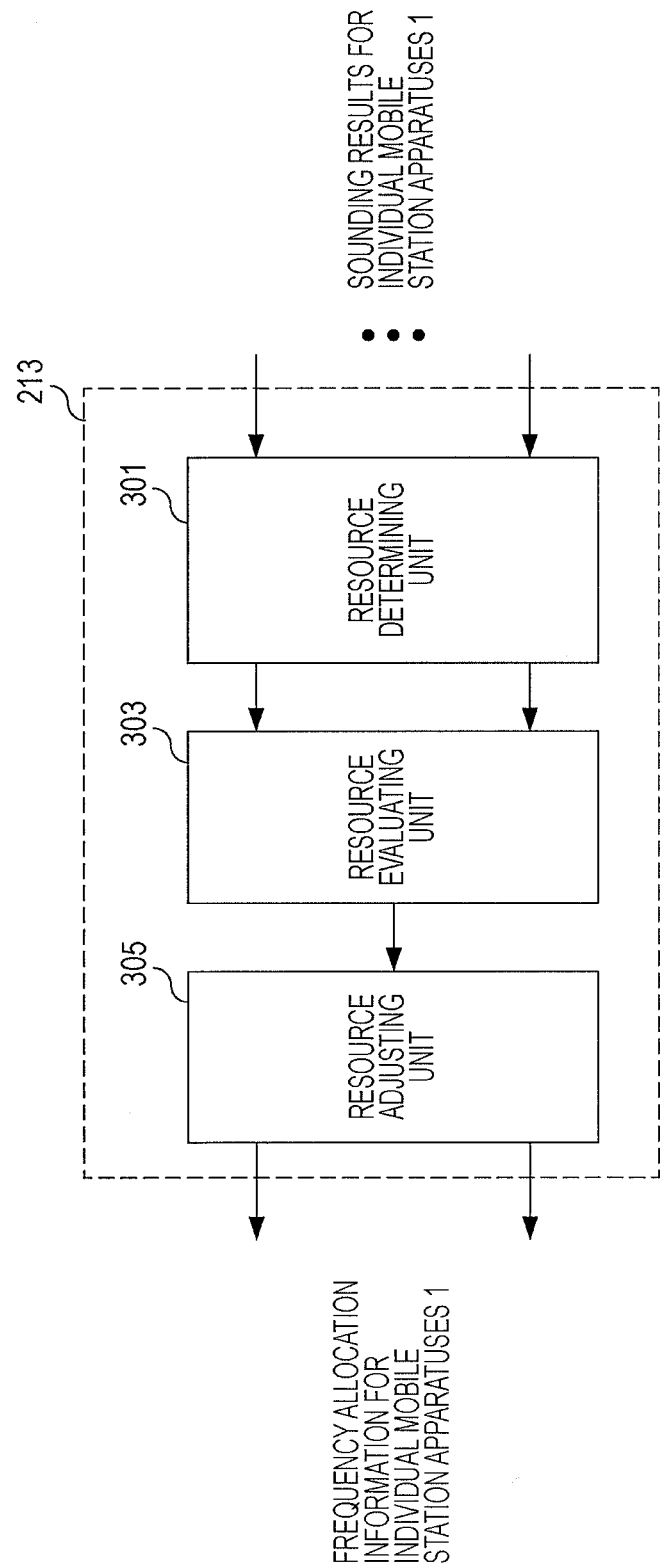
FIG. 4 is a block diagram illustrating the configuration of a scheduling unit 213 according to the first embodiment of the present invention.

FIG. 4 is a block diagram illustrating the configuration of the scheduling unit 213 according to the first embodiment of the present invention. In the scheduling unit 213, a resource determining unit 301 determines resource blocks used for transmission by the individual mobile station apparatuses 1, and inputs information about the resource blocks to a resource evaluating unit 303. The resource evaluating unit 303 compares, using expression (1), the total sum of the numbers of RBs allocated by scheduling to all the mobile station apparatuses 1 with the number of RBs included in a system band. For example, the resource evaluating unit 303 calculates an excess of the number of RBs, and outputs the information about the excess to a resource adjusting unit 305. In a case where a large number of RBs are allocated, the resource adjusting unit 305 performs adjustment so as to reduce the number of RBs. At this time, any method may be used to reduce the number of RBs. For example, among allocated RBs, RBs for the mobile station apparatus 1 to which RBs of the smallest gain of a channel obtained through sounding are allocated may be reduced. Alternatively, RBs of a small gain in overlapped allocation may be removed.

Figure 5A:
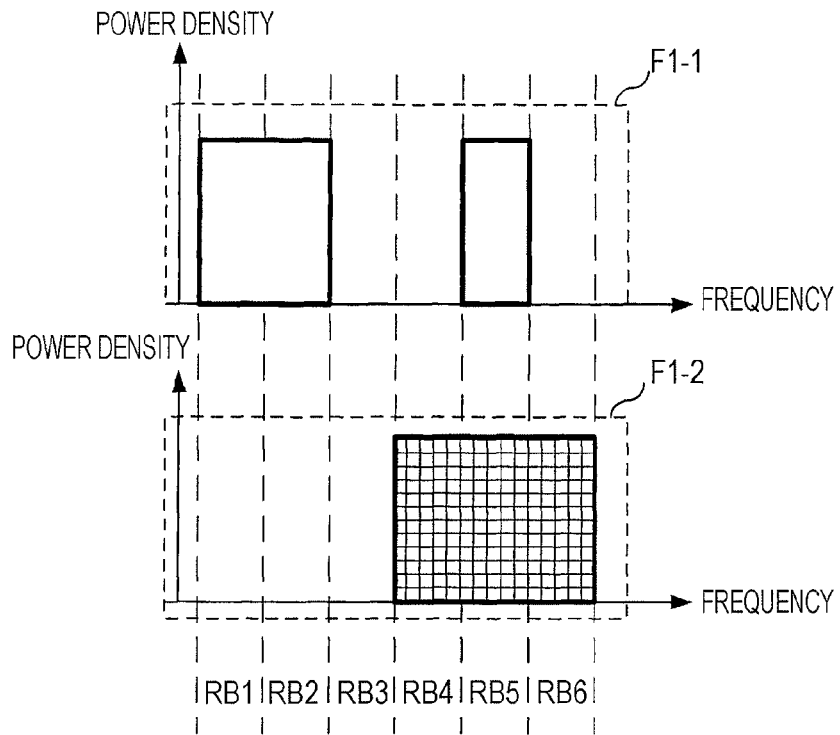
FIG. 5A is a diagram illustrating transmit frequency signals of a first mobile station apparatus 1-1 and a second mobile station apparatus 1-2 according to the first embodiment of the present invention.
Figure 5B:
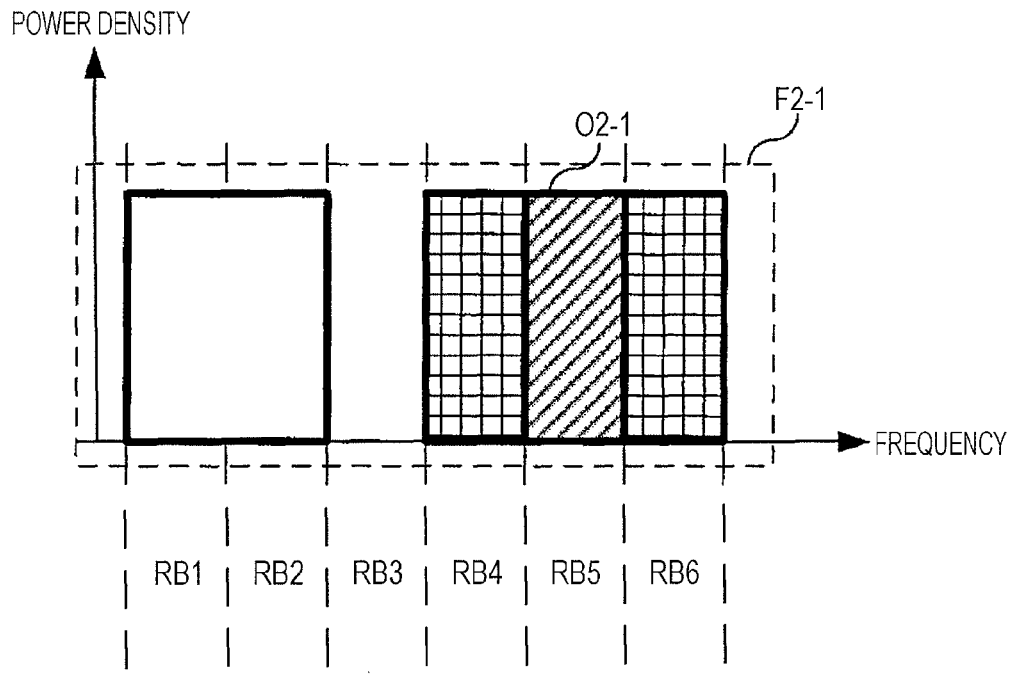
FIG. 5B is a diagram illustrating a receive frequency signal in a first base station apparatus 2-1 according to the first embodiment of the present invention.

FIG. 5A is a diagram illustrating transmit frequency signals in the first mobile station apparatus 1-1 and the second mobile station apparatus 1-2 according to the first embodiment of the present invention. FIG. 5B is a diagram illustrating a receive frequency signal in the first base station apparatus 2-1 according to the first embodiment of the present invention. The horizontal axis represents the frequency, and the vertical axis represents the power density of the frequency signal. Here, RB1 to RB6 denote resource blocks (RBs), which are the smallest units of frequency resources. In LTE, for example, each RB is constituted by twelve sub-carriers (discrete frequencies, resource elements). In FIG. 5A, a frequency signal F1-1 of the first mobile station apparatus 1-1 and a frequency signal F1-2 of the second mobile station apparatus 1-2 are illustrated. RB1, RB2, and RB5 are allocated to the first mobile station apparatus 1-1, and RB4, RB5, and RB6 are allocated to the second mobile station apparatus 1-2. At this time, the allocated signals are received as a frequency signal F2-1 by the base station apparatus 2. An overlapping portion O2-1 indicates that the signals transmitted by the first and second mobile station apparatuses 1 are received in an overlapping manner.

Next, interference to an adjacent cell will be discussed. Normally, if there are available radio resources, and if data to be transmitted exists in a buffer, the radio resources are allocated to a certain mobile station apparatus 1 in the scheduling of determining allocation of the radio resources. In the case of FIG. 5A, if there is a mobile station apparatus 1 including a buffer, RB3 is allocated to the first mobile station apparatus 1-1 or the second mobile station apparatus 1-2.

In this case, however, that is, in a case where RB3 is also allocated, the total sum of the numbers of RBs for all the mobile station apparatuses 1 is 7, because RB5 is allocated to both the mobile station apparatuses 1. As a result, interference corresponding to seven RBs with respect to the system band of six RBs is applied to an adjacent cell. Thus, as illustrated in FIG. 5A, RB3 is not allocated regardless of the buffer, that is, control is performed so that the total sum for all the mobile station apparatuses 1 becomes smaller than or equal to the system band, thereby destabilization of the system is prevented.

Generally, when it is assumed that the number of mobile station apparatuses 1 is U and the number of RBs included in the system band is M, control is performed so that the total sum of the numbers of RBs allocated to the individual mobile station apparatuses 1 becomes M or less. This is evaluated by using expression (1).

[Math. 1]

$$\sum_{u=1}^{U} N(u) \leq M \quad (1)$$

In expression (1), N(u) represents the number of RBs allocated to the u-th mobile station apparatus 1. Such control stabilizes the system.

Figure 6:
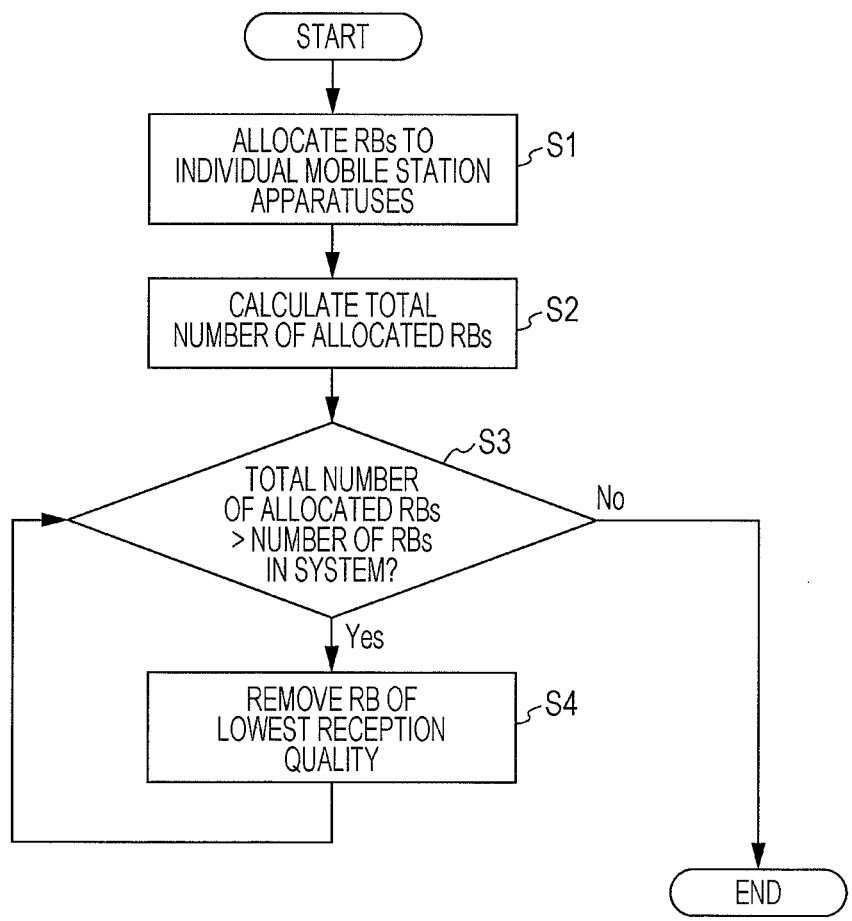
FIG. 6 is a flowchart illustrating the operation of the base station apparatus 2 according to the first embodiment of the present invention.

FIG. 6 is a flowchart illustrating the operation of the base station apparatus 2 according to the first embodiment of the present invention. First, the base station apparatus 2 allocates RBs to the individual mobile station apparatuses 1 (step S1). At this time, a method for allocating high-quality RBs may be used in accordance with a maximum overlap ratio determined by the system. Subsequently, the base station apparatus 2 calculates the total number of allocated RBs (step S2). Subsequently, the base station apparatus 2 determines whether or not the total number of allocated RBs is larger than the number of RBs in the system (step S3). If the total number of RBs is larger than the number of RBs in the system (YES in step S3), the base station apparatus 2 removes a RB of the lowest reception quality (for example, SINR) or the lowest priority of allocation among the RBs allocated to all the mobile station apparatuses 1 (step S4), and the process returns to step S3. If the number of allocated RBs is not larger than the number of RBs in the system (NO in step S3), the base station apparatus 2 determines the allocation.

As described above, in this embodiment, the number of RBs allocated to all the mobile station apparatuses 1 is adjusted to be smaller than or equal to the number of RBs included in the system band. That is, the base station apparatus 2 performs control to suppress variations of an interference level caused by overlap in the case of determining frequency allocation while allowing overlap, so that the system can be stabilized.

Second Embodiment

In the second embodiment, unlike in the first embodiment in which the number of RBs to be used is reduced, a control value for transmit power control is changed to control the amount of interference. For example, in the LTE system, the transmit power of each mobile station apparatus 1 in uplink is defined by expression (2).

[Math. 2]

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad (2)$$

In expression (2), $P_{PUSCH}(i)$ represents the transmit power of the mobile station apparatus 1 in the i-th subframe (a unit of transmission in the time domain), $P_{CMAX}$ represents the maximum transmit power of the mobile station apparatus 1, $M_{PUSCH}(i)$ represents the number of RBs allocated in the i-th subframe, and $P_{O\_PUSCH}(j)$ represents target receive power per one RB, and represents the sum of a target reception level specific to a cell $P_{O\_PUSCH\_NOMINAL}(j)$ and target receive power specific to a mobile station apparatus $P_{O\_UE\_PUSCH}(j)$ in a transmission method j. Further, $\alpha(j)$ represents a parameter specific to a cell in the transmission method j and is a real number ranging from 0 to 1, PL represents the path-loss between the base station apparatus 2 and the mobile station apparatus 1, $\Delta_{TF}(i)$ represents a parameter determined by the modulation scheme applied in the i-th subframe, and f(i) represents a correction term for closed-loop transmit power control notified from the mobile station apparatus 1 in the i-th subframe. That is, expression (2) expresses that the transmit power necessary for achieving the target receive power is set so as not to be higher than the maximum transmit power allowed in the mobile station apparatus 1.

Next, the transmission method j will be described. The transmission method j described here has a number assigned thereto in accordance with the channel used for transmission or a scheduling method. j=0 represents semi-persistent scheduling (SPS) in which scheduling independent of a channel condition is performed in resource allocation for voice call or the like (voice over IP (VoIP)), j=1 represents dynamic scheduling in which scheduling is performed in accordance with a channel condition, mainly used in packet data communication, and j=2 represents a random access channel (RACH) that is transmitted for a change in timing of signal transmission from the mobile station apparatus 1 or synchronization of a signal in uplink, particularly, a RACH (involving an operation called Contention based Random Access Procedure) that is transmitted in a case where collision with a RACH of another mobile station apparatus 1 may occur, such as at the time of initial connection. $\alpha(j)$ is defined as expression (3).

[Math. 3]

$$\alpha(j) = \begin{cases} \{0, 0.4, 0.5, 0.6, 0.7, 0.8, 0.9, 1.0\} & j = 0, 1 \\ 1 & j = 2 \end{cases} \quad (3)$$

This is a parameter that is set to increase the receive power level as the distance from the base station apparatus 2 decreases. For example, in a case where $\alpha(j)=1$, it means that a path-loss is completely compensated for (attenuation caused by a transmission distance or shadowing is compensated for by increasing transmit power). Transmit power control has an influence on IoT of an adjacent cell. Thus, even if the number of RBs allocated to all the mobile station apparatuses 1 using SORM is larger than the number of RBs included in the system band, setting the target receive power of transmit power control to be low enables SORM to be applied without increasing an interference level for an adjacent cell. Thus, in this embodiment, a description will be given of a method for setting the value of $P_{O\_PUSCH}$ in accordance with the maximum overlap ratio allowed by the system.

Figure 7:
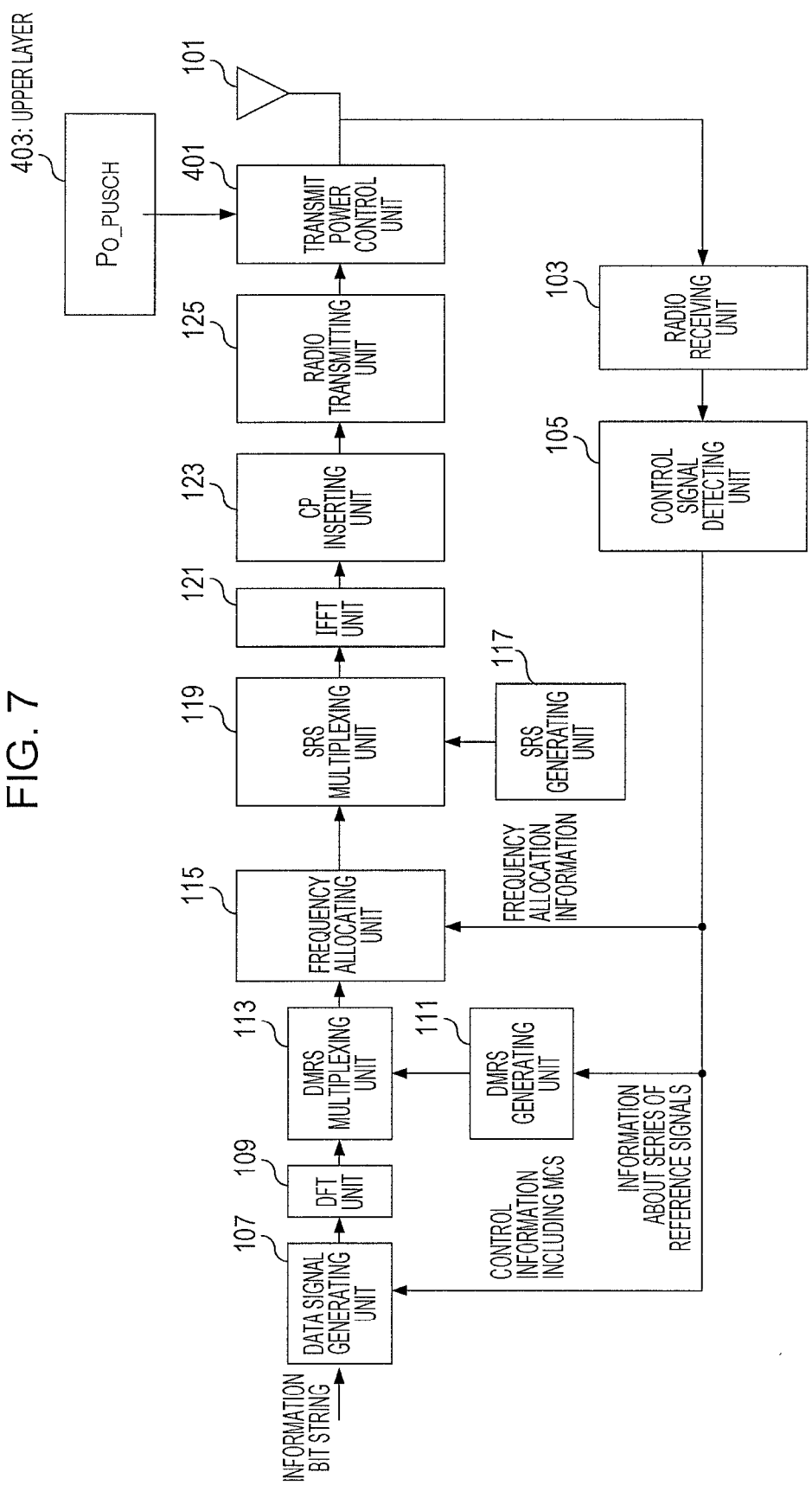
FIG. 7 is a block diagram illustrating the configuration of a mobile station apparatus 1 according to a second embodiment of the present invention.

FIG. 7 is a block diagram illustrating the configuration of a mobile station apparatus 1 according to the second embodiment of the present invention. In FIG. 7, the same reference numerals denote the same elements as those in the first embodiment, and thus the description thereof is omitted. FIG. 7 explicitly describes a transmit power control unit 401. In this embodiment, as described above, the value of $P_{O\_PUSCH}$ in the target reception level of transmit power is adjusted. Accordingly, compared to the first embodiment, it is not necessary to consider the balance between each mobile station apparatus 1 and another mobile station apparatus 1. The transmit power control unit 401 performs transmit power control so as to obtain transmit power calculated by using expression (2) on the basis of $P_{O\_PUSCH}$ notified from an upper layer 403. However, notification of $P_{O\_PUSCH}$ may be performed using a control signal in a physical layer, instead of using the upper layer 403. In the present invention, a description is given that $P_{O\_PUSCH}$ is controlled. In consideration that transmit power may be eventually adjusted, f(i) in expression (2) may be used instead of $P_{O\_PUSCH}$. Of course, this is applicable to another embodiment of this description in a case where control is performed using transmit power control.

Figure 8:
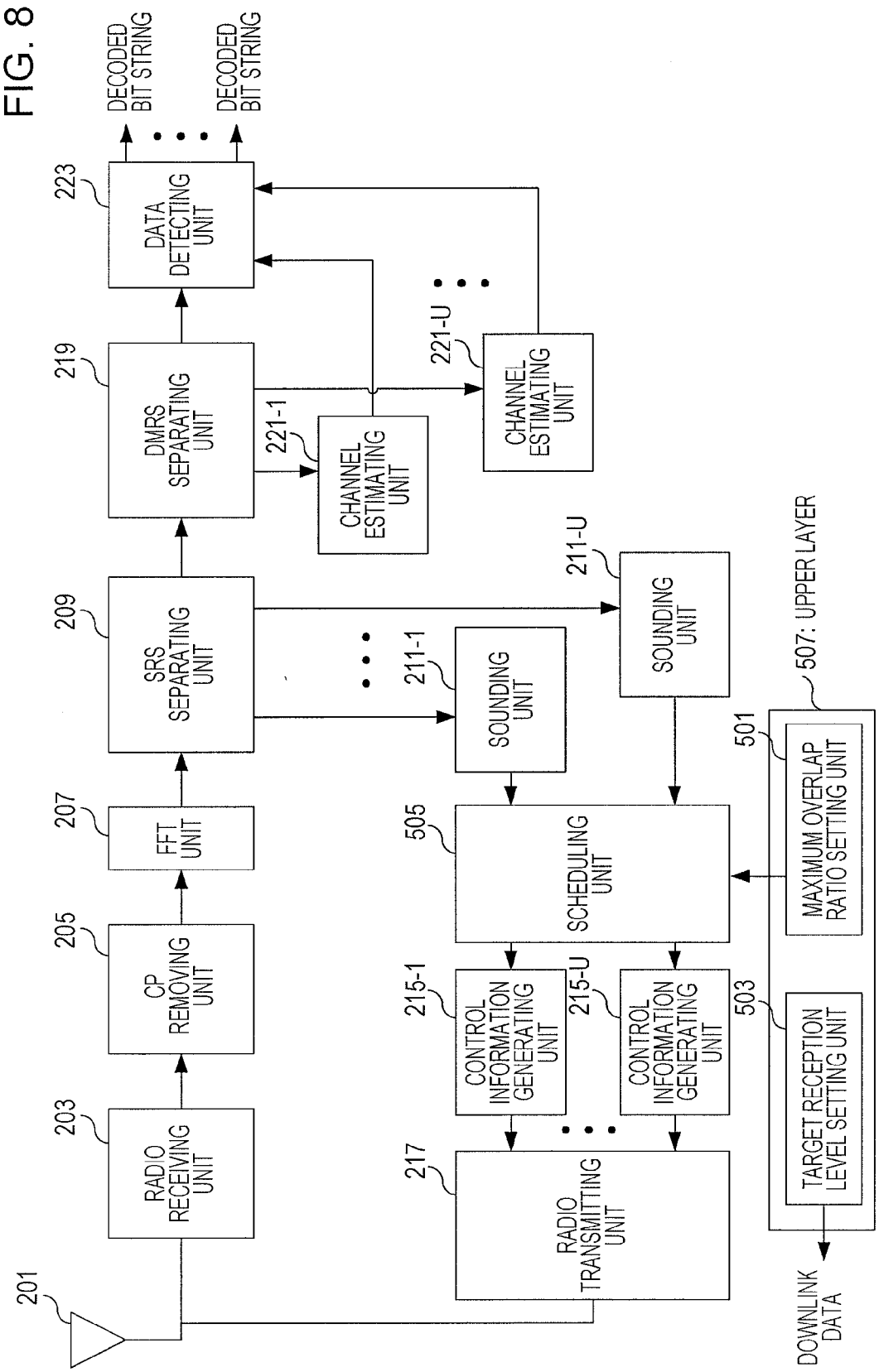
FIG. 8 is a block diagram illustrating the configuration of a base station apparatus 2 according to the second embodiment of the present invention.

FIG. 8 is a block diagram illustrating the configuration of a base station apparatus 2 according to the second embodiment of the present invention. The configuration illustrated in FIG. 8 is based on the configuration illustrated in FIG. 3, and the same reference numerals denote the same functions or means as those in FIG. 3. A maximum overlap ratio setting unit 501 sets a maximum number of RBs or a maximum overlap ratio. Allocation of a maximum number of RBs means allocation to all the mobile station apparatuses 1 with respect to the number of RBs included in the system band, and this value may be the number of RBs or may be a ratio to the number of RBs included in the system band. Alternatively, an optimal value obtained through a simulation or the like may be set as this value in advance. For example, when it is assumed that the maximum overlap ratio is set to be 20% and that the number of RBs included in the system band is 50, 50+50×0.2=60 RBs may be allocated to all the mobile station apparatuses 1.

A target reception level setting unit 503 includes means for setting a target reception level in accordance with the above-described maximum overlap ratio. For example, in the above-described example, 60 RBs may be allocated to all the connected mobile station apparatuses 1, and thus the value of $P_{O\_PUSCH}$ may be reduced by 50/60=0.83 times=−0.8 dB.

Figure 9:
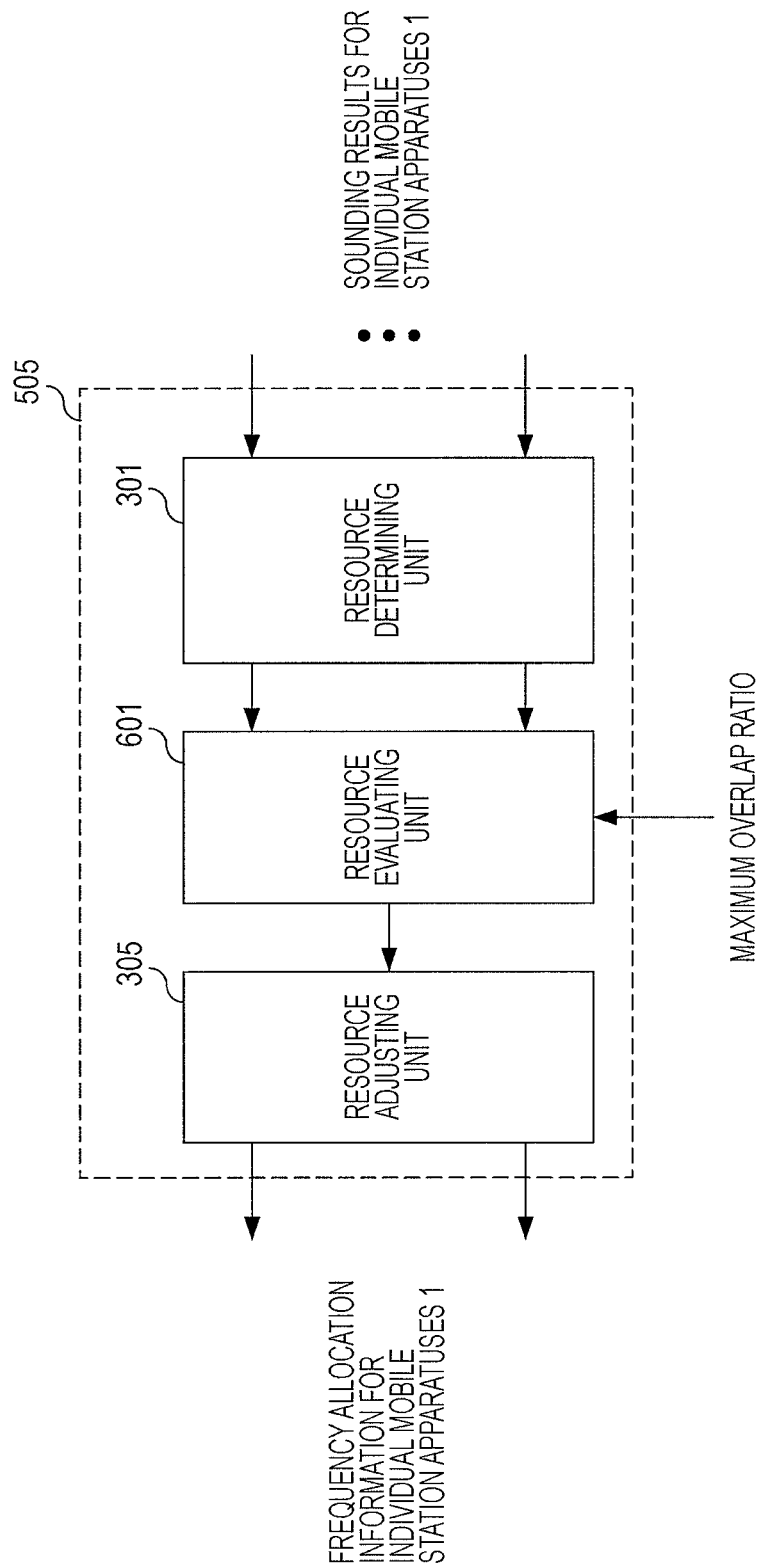
FIG. 9 is a block diagram illustrating the configuration of a scheduling unit 505 according to the second embodiment of the present invention.

FIG. 9 is a block diagram illustrating the configuration of a scheduling unit 505 according to the second embodiment of the present invention. In the scheduling unit 505, as in FIG. 4, the resource determining unit 301 determines frequency allocation on the basis of sounding results, a resource evaluating unit 601 evaluates whether or not the number of RBs is large on the basis of the frequency allocation and a maximum overlap ratio. If the number of RBs is large, the resource evaluating unit 601 outputs information indicating how large the number is. After that, the resource adjusting unit 305 adjusts the number of RBs and determines the allocation information for the individual mobile station apparatuses 1.

Figure 10:
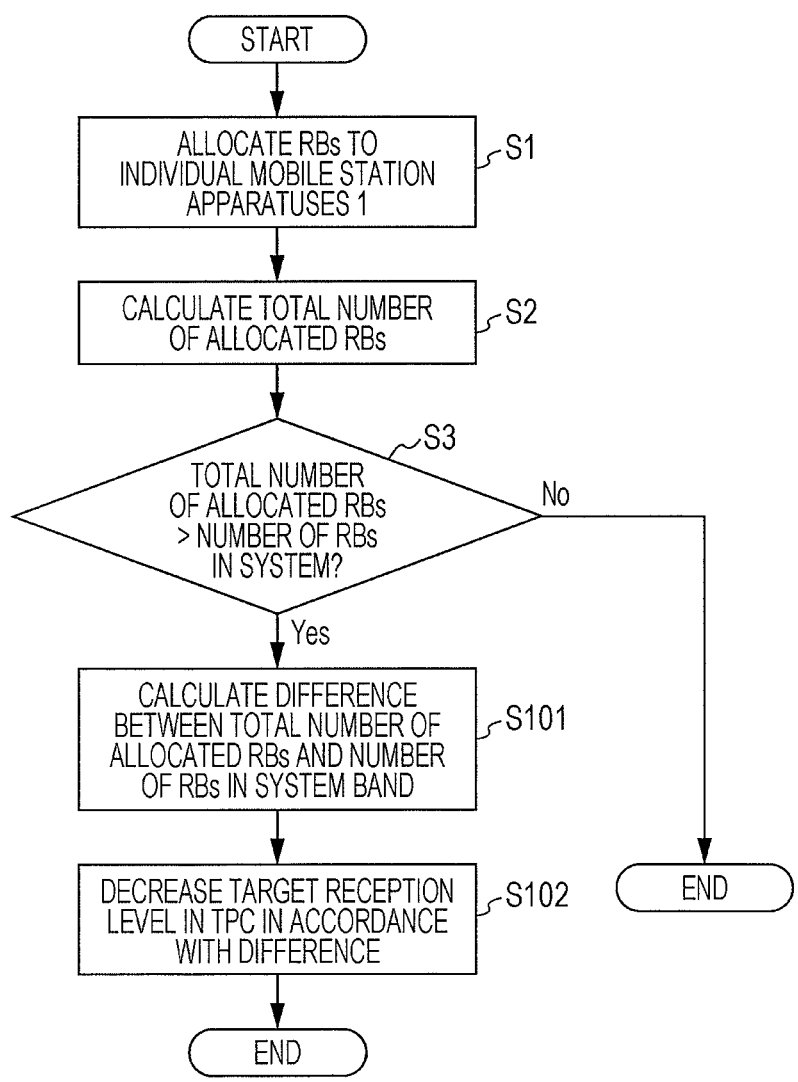
FIG. 10 is a flowchart illustrating the operation of the base station apparatus 2 according to the second embodiment of the present invention.

FIG. 10 is a flowchart illustrating the operation of the base station apparatus 2 according to the second embodiment of the present invention. Steps S1 to S3 are the same as those in FIG. 6 according to the first embodiment. In this embodiment, if the total number of RBs is larger than the number of RBs in the system (YES in step S3), the base station apparatus 2 calculates the difference between the total number of RBs and the number of RBs in the system band (step S101). For example, if the total number of RBs for all the connected mobile station apparatuses 1 is 20 and if the number of RBs included in the system band is 16, the value 20−16=4 is calculated in this case. Subsequently, the base station apparatus 2 sets the target reception level in transmit power control to be lower by the amount corresponding to the calculated number of RBs (step S102). Specifically, in this example, the number of allocated RBs is larger by 4, and thus the transmit power needs to be reduced by the amount corresponding to 4 RBs. That is, in the case of allocating 20 RBs to all the mobile station apparatuses 1 by allowing overlap, the base station apparatus 2 causes the transmit power of the mobile station apparatuses 1 to be equal to the transmit power that is allocated to 16 RBs in a case where overlap is not allowed. In other words, the base station apparatus 2 sets the transmit power for each RB to be reduced to a value 16/20=4/5 times the original value. This may be expressed as follows using decibel: 10×log₁₀(4/5)=−0.97 dB. Thus, the base station apparatus 2 sets the target reception level to be reduced by 0.97 dB.

In this way, the base station apparatus 2 determines $P_{O\_PUSCH}$ on the basis of interference to an adjacent cell (IoT estimated in each base station apparatus 2), and thereby a system applying SORM can be stabilized.

Third Embodiment

Now, as a third embodiment, a method for controlling both $P_{O\_PUSCH}$ and α on the basis of a concept similar to that of the second embodiment will be described.

FIG. 11 is a graph illustrating the relationship between the receive power of the base station apparatus 2 and PL in a case where α is changed in the third embodiment of the present invention. In FIG. 11, the horizontal axis represents PL (dB) in expression (2), and the vertical axis represents receive power. A line 701 in a case where α=1 indicates that control is performed to keep constant receive power regardless of the value of PL. A line 702 in a case where α is smaller than 1 indicates that setting is performed so that the receive power increases as the value of PL decreases, that is, as the distance from the base station apparatus 2 decreases. Such a method for transmit power control is referred to as fractional transmit power control (FTPC), and has been introduced to recent wireless communication systems, such as the LTE system. Generally, in uplink, a mobile station apparatus 1 farther from the base station apparatus 2 is more likely to be a strong interference source to an adjacent cell. Thus, if $P_{O\_PUSCH}$ and α are appropriately controlled, the amount of interference to an adjacent cell (IoT measured by the base station apparatus 2 in an adjacent cell) can be kept constant without degrading reception quality of the mobile station apparatus 1 near the base station apparatus 2.

For example, under the assumption of an FDMA (Frequency Division Multiple Access) scheme, in which transmission to the base station apparatus 2 is performed without causing overlap of frequency resources among the mobile station apparatuses 1, in a case where the distance between base station apparatuses is 500 m, three sectors, $P_{O\_PUSCH}$=−106 dBm, and α=1, if an average IoT is about 7 dB, the condition for achieving an equivalent IoT is $P_{O\_PUSCH}$=−85 dBm and α=0.8. On the basis of this concept, in a case where the maximum overlap ratio is 20%, it is necessary to reduce transmit power by −0.8 dB. In the third embodiment, as a method for realizing an effect equivalent to this, the values of $P_{O\_PUSCH}$ and α are controlled. Specifically, in a case where $P_{O\_PUSCH}$=−76 dBm and α=0.7, the transmit power per one RB is reduced by about 1 dB. The values of $P_{O\_PUSCH}$ and α may be determined through a simulation or may be actually measured. The configuration of the base station apparatus 2 realizing the above is the same as the configuration illustrated in FIG. 8. The target reception level setting unit 503 sets the values of $P_{O\_PUSCH}$ and α.

As described above, as a result of applying the present invention, the system can be stabilized even if transmit power in the entire cell increases due to overlapping.

The first to third embodiments may be applied in combination of one and another. The intrinsically same effect may be obtained by using a method in which at least any one of $P_{O\_PUSCH}$ and α is determined first and a maximum overlap ratio is set. Further, to control IoT between the base station apparatuses 2, notification may be made as an OI (Overload Indicator) or an HII (High Interface Indicator) by using an X2 interface, which is a wired interface between the base station apparatuses 2. Furthermore, the present invention is applicable to a heterogeneous network in which the radiuses of cells are different, or relaying in which relay stations are installed in picocells, femtocells, or cells, in order to control an interference level.

A program which operates in the mobile station apparatuses 1 and the base station apparatuses 2 according to the present invention is a program (program causing a computer to function) which controls a CPU or the like so as to implement the functions of the above-described embodiments according to the present invention. The information dealt with by these apparatuses is temporarily stored in a RAM at the time of processing thereof, and is then stored in various types of ROM or HDD, and is read out, corrected, or written by the CPU if necessary. A recording medium for storing the program may be any of a semiconductor medium (for example, a ROM, a nonvolatile memory card, etc.), an optical recording medium (for example, a DVD, an MO, an MD, a CD, a BD, etc.), and a magnetic recording medium (for example, a magnetic tape, a flexible disk, etc.). The functions of the above-described embodiments may be implemented through execution of a loaded program, or the functions of the present invention may be implemented through processing which is performed in conjunction with an operating system or another application program or the like in response to an instruction of the program.

In the case of circulating the program on the market, the program may be stored in portable recording media so as to be circulated, or the program may be transferred to a server computer which is connected via a network, such as the Internet. In this case, a storage device of the server computer is included in the present invention. Furthermore, some or all of the mobile station apparatuses 1 and the base station apparatuses 2 according to the above-described embodiments may be implemented by an LSI, which is typically an integrated circuit. The individual functional blocks of the mobile station apparatuses 1 and the base station apparatuses 2 may be individually mounted on chips, or some or all of them may be integrated to be mounted on a chip. A method for integration may be realized by a dedicated circuit or a general-purpose processor, as well as an LSI. In a case where the progress of semiconductor technologies produces an integration technology which replaces an LSI, an integrated circuit according to the technology can be used.

The embodiments of the present invention have been described in detail with reference to the drawings. The specific configurations are not limited to those of the embodiments, and design within a scope of the gist of the present invention is also included in the claims. The present invention may be favorably applied to a mobile communication system in which mobile phone apparatuses serve as the mobile station apparatuses 1, but the present invention is not limited thereto.

REFERENCE SIGNS LIST 1, 1-1, 1-2, 1-3, 1-4 mobile station apparatus
2, 2-1, 2-2 base station apparatus
101 antenna
103 radio receiving unit
105 control signal detecting unit
107 data signal generating unit
109 DFT unit
111 demodulation reference signal generating unit
113 demodulation reference signal multiplexing unit
115 frequency allocating unit
117 sounding reference signal generating unit
119 sounding reference signal multiplexing unit
121 IFFT unit
123 CP inserting unit
125 radio transmitting unit
201 antenna
203 radio receiving unit
205 CP removing unit
207 FFT unit
209 sounding reference signal separating unit
211, 211-1 to 211-U sounding unit
213 scheduling unit
215-1 to 215-U control information generating unit
217 radio transmitting unit
219 demodulation reference signal separating unit
221-1 to 221-U channel estimating unit
223 data detecting unit
301 resource determining unit
303 resource evaluating unit
305 resource adjusting unit
401 transmit power control unit
403 upper layer
501 maximum overlap ratio setting unit
503 target reception level setting unit
505 scheduling unit
601 resource evaluating unit
701 line in a case where $\alpha=1$
702 line in a case where $\alpha$ is a value smaller than 1
F1-1, F1-2, F2-1 frequency signal
O2-1 overlapping portion

The invention claimed is:

1. A wireless control apparatus that allows a plurality of wireless terminal apparatuses to locate transmit signals at part of frequencies in a system band in an overlapping manner, the wireless control apparatus comprising:
   scheduling circuitry that allocates frequency resources on which the individual wireless terminal apparatuses map transmit signals;
   target reception level setting circuitry that calculates a target receive power in the wireless control apparatus by using a received power with which the interference level of the entire system band is lower than or equal to the certain value, and an overlap ratio of frequency resources at which transmit signals are mapped in an overlapping manner in the system band; and
   radio transmitting circuitry that transmits, to the individual wireless terminal apparatuses, the target receive power and a cell specific parameter controlled by the wireless control apparatus; wherein
   transmit power values of the individual wireless terminal apparatuses are calculated on the basis of the target receive power and the cell specific parameter.

2. The wireless control apparatus according to claim 1, wherein
   a total sum of frequency bands in the frequency resources allocated to the individual wireless terminal apparatuses is smaller than or equal to the system band.

3. The wireless control apparatus according to claim 1, wherein
   the interference level is derived from IoT (Interference over Thermal noise power ratio).

4. The wireless control apparatus according to claim 3, wherein
   the IoT is determined by a parameter of transmit power control performed by the Wireless terminal apparatuses.

5. The wireless control apparatus according to claim 4, wherein
the transmit power control is fractional transmit power control.

6. The wireless control apparatus according to claim 3, wherein, in case of allocating frequency resources at which the individual wireless terminal apparatuses map transmit signals, the wireless control apparatus determines, on the basis of the IoT, an amount of radio resources at which transmit signals are located in an overlapping manner and an amount of radio resources which are not used.

7. A communication method in a wireless control apparatus that allows a plurality of wireless terminal apparatuses to locate transmit signals at part of frequencies in a system band in an overlapping manner, the communication method comprising:
allocating frequency resources on which the individual wireless terminal apparatuses map transmit signals;
calculating a target receive power in the wireless control apparatus by using a received power with which the interference level of the entire system band is lower than or equal to the certain value, and an overlap ratio of frequency resources at which transmit signals are mapped in an overlapping manner in the system band; and
transmitting, to the individual wireless terminal apparatuses, the target receive power and a cell specific parameter controlled by the wireless control apparatus, wherein
transmit power values of the individual wireless terminal apparatuses are calculated on the basis of the target receive power and the cell specific parameter.

* * * * *